Figure 1:
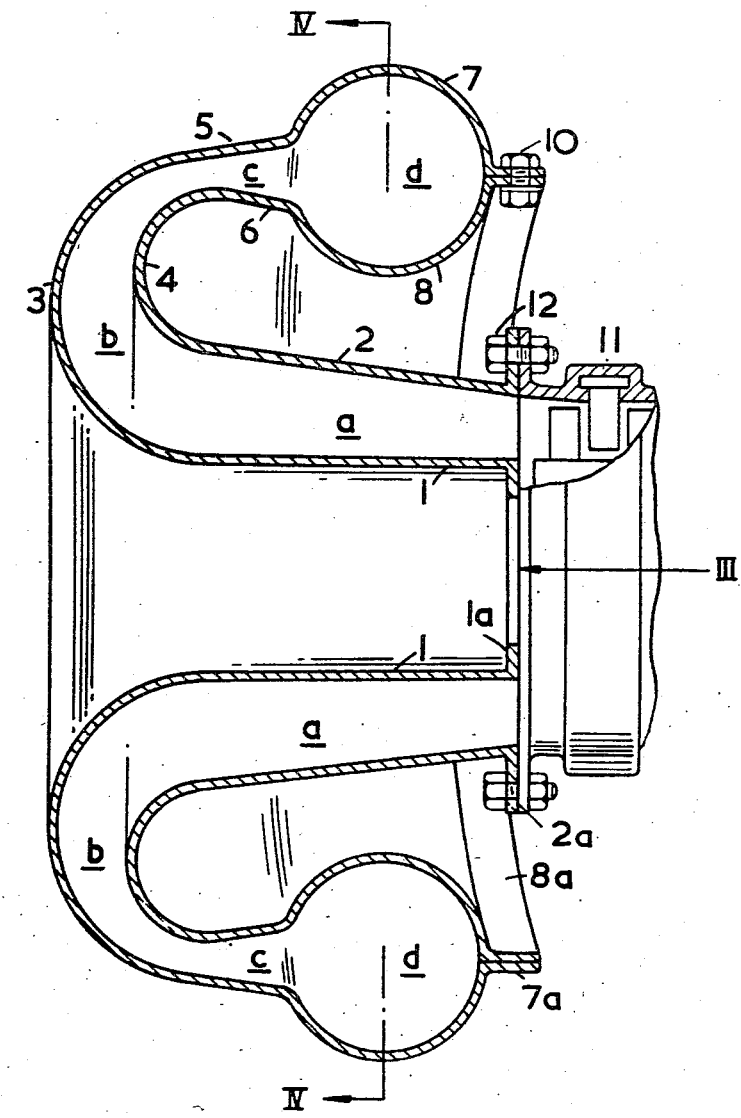

United States Patent Office 2,781,057
Patented Feb. 12, 1957

2,781,057
TURBINE OUTLET DUCTING

Philip John Fletcher, Cove, Farnborough, England, assignor to Power Jets (Research and Development) Limited, London, England, a British company Application March 1, 1954, Serial No. 413,336

Claims priority, application Great Britain March 6, 1953

10 Claims. (Cl. 138—39)

Ducting for leading the exhaust gases from one end of a steam, gas, or like turbine in a direction other than axially, and around the turbine so as to leave the turbine rotor bearing exposed has hitherto been in the form of a volute immediately around the outlet, and this volute has usually also provided for diffusion.

The object of the present invention is to reduce considerably the loss of head which is experienced with the aforesaid type of outlet ducting and furthermore to do so while keeping the axial length occupied by the outlet reasonably short and leaving the bearing completely accessible.

The invention consists in a form of a duct unit for fluid, affording diffusion and also effecting transition from an annular diffuser duct, by way of a toroidal duct disposed around the diffuser axis, to a pipe extending transversely to the diffuser axis. With the object of avoiding losses due to whirling around the axis of the toroid which would be set up by introducing the gases into this duct unsymmetrically, and in particular tangentially, the primary feature of the invention is that an annular diffuser passage continuing axially from the turbine outlet discharges directly or indirectly centrally into the toroidal duct along a radius of the cross section of the toroidal duct. Furthermore the toroidal duct is of progressively varying cross-section, such that it is non-diffusing.

The toroidal duct merges into a pipe extending usually radially away from it; the gases enter this toroidal duct around substantially its whole circumference and accordingly the gases flow towards the pipe in two streams flowing in opposite directions from a point on the toroidal outlet which is diametrically opposite the pipe, the streams being of progressively increasing volume so that the cross sectional area of the toroid accordingly progressively increases to accommodate this increase of volume but without diffusion. In order to provide sufficient length of path for the gases between a turbine and the annular entry into the toroidal duct to prevent disturbances due to the peculiar nature of the flow in this duct from affecting the turbine, it is an important feature of the invention to provide, between the axially extending diffuser and the annular inlet to the toroidal duct, an annular non-diffusing connection having the section of a substantially 180° pipe bend. There may be a further straight diffuser connecting the pipe bend member to the toroidal duct and enveloping the first diffuser, so that a considerable length and small angle of diffuser is obtained with minimum axial length. Preferably, according to an important feature of the invention, the member affording the 180° bend has a slight progressive decrease of cross-sectional area, the whole of the diffusion being afforded by the one or two straight annular diffusers and no diffusion taking place where there is any change of direction of flow.

Figure 2:
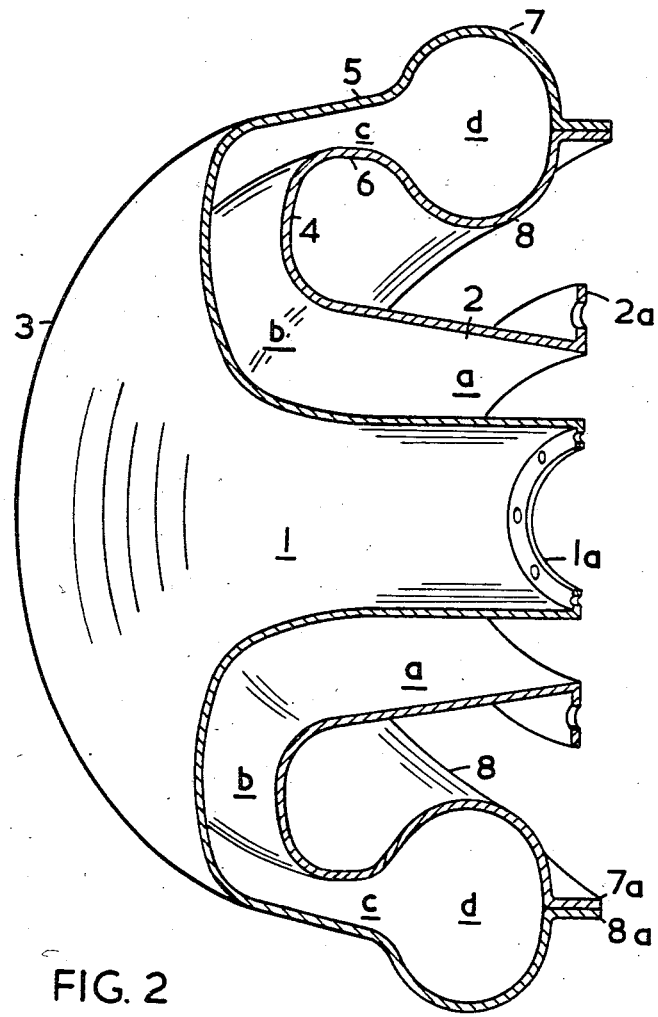
Figure 3:
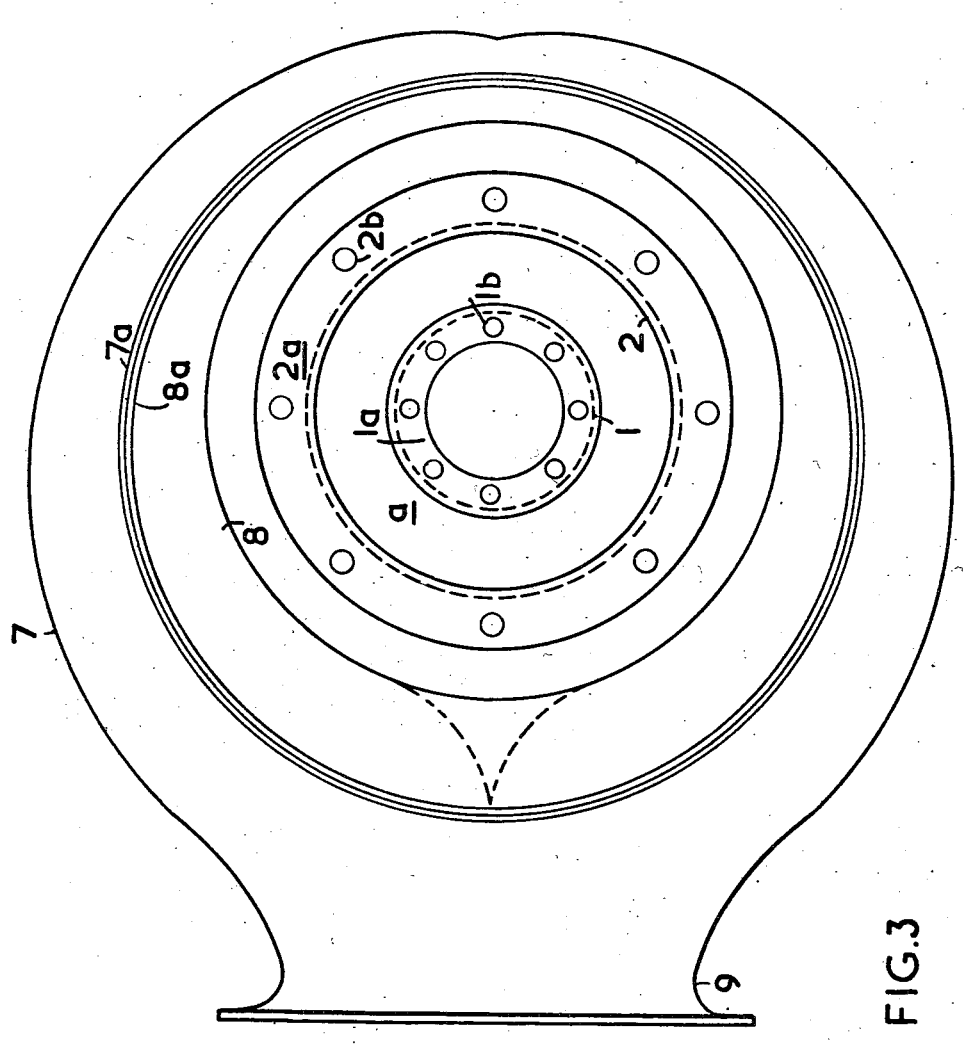
Figure 4:
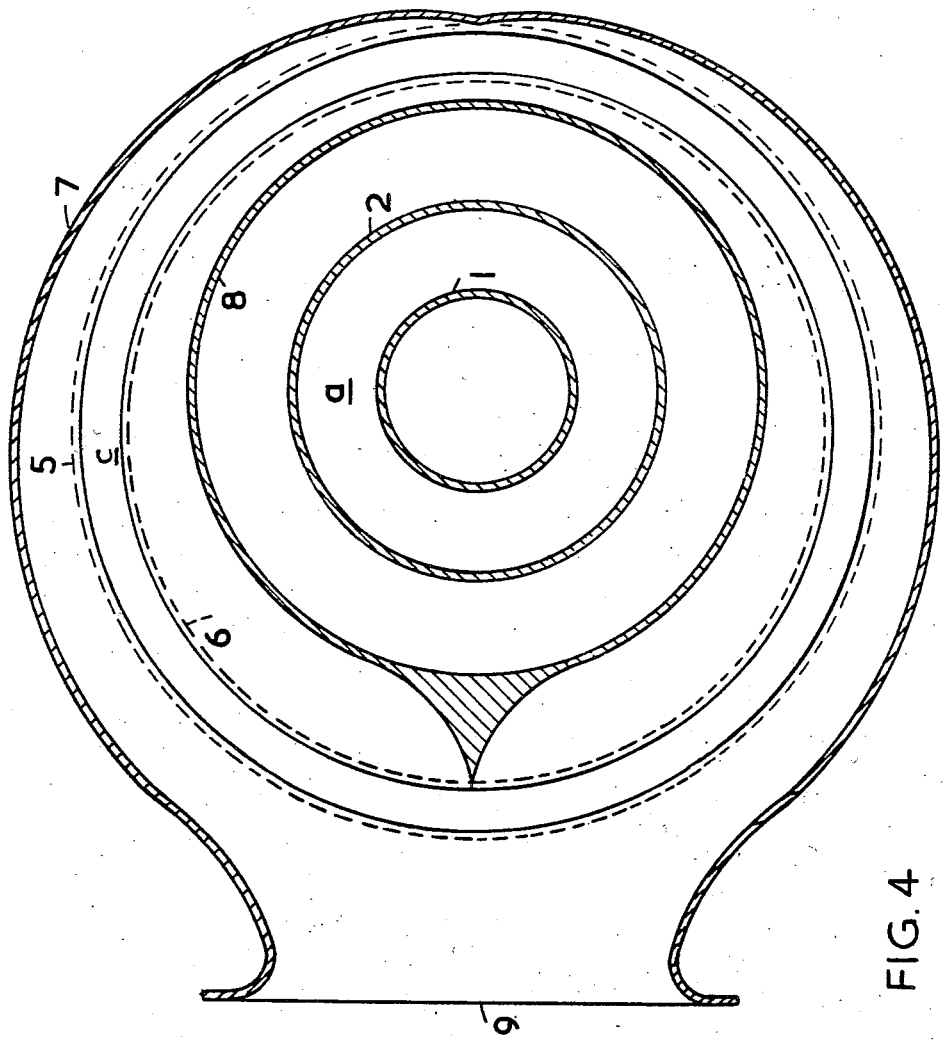

One particular form of construction of duct according to the invention, suitable for attaching to the annular outlet of an axial flow turbine, is shown in the accompanying drawings, of which:

Figure 1 is a view in section on the axis of the diffuser;
Figure 2 is a corresponding view in semi-perspective;
Figure 3 is a view looking on Figure 1 in the direction of arrow III; and Figure 4 is a sectional view looking on Figure 1 in the direction of arrow IV.

In this construction a straight annular diffuser $a$ which can be mounted to extend from the outlet of a turbine is made up of inner and outer walls 1 and 2 flanges at $1a$ and $2a$ for attachment to the turbine. The walls 1 and 2 are continued by two annular troughs 3 and 4 which members together define a 180° bend $b$ forming a continuation of the gas path from the diffuser and having a width decreasing progressively outwardly from the axis of the unit in such a manner that the cross-sectional area of the path progressively decreases slightly. Thus the outer trough 3 may be of semi-circular cross-section and the inner trough 4 of a cross-section curved to give the desired progressive change of area. A continuation from the outer ends of the two trough members 3 and 4 is formed by a second straight annular diffuser $c$ bounded by walls 5 and 6 concentric with the diffuser $a$. This diffuser $c$ is connected to and discharges substantially radially into a toroidal duct $d$ formed by walls 7 and 8 disposed around the axis of the unit. At one position this toroidal duct $d$ merges into a final outlet pipe 9 which is flanged for receiving a connecting conduit extending at right angles to the axis of the unit. The toroidal duct $d$ is of circular cross-section with an area which increases progressively up to the said position from each side thereof, from a position diametrically opposite, to accommodate the gas entering all around the annular inlet from the diffuser $c$, without appreciable diffusion.

The unit is split along a diameter of the toroidal duct $d$ parallel to the axis of the unit, the inner and outer walls 8 and 7 thus meeting by the engagement of flanges $8a$ and $7a$ disposed around the axis. Each of the cylindrical flanges $7a$ and $8a$ may have its inside surface machined for engaging the other. The semicylindrical part of outer wall 7 carries and merges into the said flanged pipe 9 by merging into two smoothly curved portions for directing the two streams smoothly into the final outlet pipe 9. A sufficiently gas-tight joint may be formed by the contact between the two halves of the unit at the flanges $7a$ and $8a$. Some fitting bolts 10 with nuts may however be provided around the flanges to tie together and relatively locate the two halves of the unit. In order that the dimensions of the bend $b$ shall be sufficiently accurate the interior of the wall 3, the outer face of flange $1a$ and the inner face of flange $7a$ may be machined in one operation, the opposed face of wall 4 and the outer faces of flanges $8a$ and $2a$ being likewise machined in one operation; the flanges $1a$ and $2a$ can then be accurately aligned and held together by temporary attachment to a support by bolts through the holes $1b$ and $2b$ while the holes for the fitting bolts 10 are drilled through flanges $7a$ and $8a$. If, in use, the unit be attached to some other duct—e. g. a turbine outlet—only by the flange $2a$, for example, then the bolts 10 relatively locate the two halves of the unit. Alternatively, the flanges $1a$ and $2a$ can be both accurately faced against other flanges to which they are bolted through holes $1b$ and $2b$, with packing inserted if necessary, after which the bolts 10 may if desired be removed to leave slight freedom for expansion of the unit without distortion. Alternatively or additionally the unit may be divided along radii thereof into two or more arcuate divisions flanged and bolted together.

Figure 1 shows how the unit may be bolted to the annular outlet from a turbine 11 by bolts and nuts 12.

I claim:
1. A diffusing and direction-changing duct unit for fluid, having an annular diffuser duct portion with radially spaced inner and outer walls arranged circularly about an axis to define an axially extending diffuser annulus, said walls being straight in the axial direction, a toroidal duct portion connected to the diffuser and disposed around the diffuser axis, and a pipe extending from the toroidal duct transversely to the diffuser axis, wherein the diffuser discharges into the toroidal duct substantially along a radius of the toroid and wherein the toroidal duct is of varying cross-section around its circumference and substantially non-diffusing.

2. A diffusing and direction-changing duct unit for fluid, having an annular diffuser duct portion with radially spaced inner and outer walls arranged circularly about an axis to define an axially extending diffuser annulus, a toroidal duct portion disposed around the outside of the diffuser, an annular connection from the diffuser to an annular inlet around the toroidal duct, which connection has at least in part the section of a substantially 180° pipe bend, and a pipe extending from the toroidal duct transversely to the diffuser axis, wherein the said annular connection is substantially non-diffusing around the bend and the toroidal duct portion varies progressively in cross-section and is substantially non-diffusing.

3. A diffusing and direction-changing duct unit for attaching to the outlet from an elastic fluid turbine, consisting of radially spaced inner and outer walls arranged circularly about an axis to form an axially extending annular diffuser, an annular and substantially non-diffusing connection extending therefrom and curved outwardly through approximately 180° to reverse the direction of fluid flow, a continuation of said connection constituting a second annular diffuser disposed around and directed oppositely from the first, a toroidal duct disposed around the first annular diffuser with an annular inlet into which the said second diffuser discharges substantially along a radius of the toroid, and a pipe outlet from the toroid, extending substantially radially outwardly from the axis of the first diffuser, the toroid having a minimum diameter diametrically opposite to the outlet pipe and so progressively enlarging towards the pipe as to be substantially non-diffusing.

4. A diffusing and direction-changing duct unit for fluid, having an annular diffuser duct portion with radially spaced inner and outer walls arranged circularly about an axis to define an axially extending diffuser annulus, said walls being straight in the axial direction, a toroidal duct portion disposed around the diffuser axis, a pipe extending transversely to the said axis and connections between said diffuser portion and said toroidal portion and between the latter and said pipe, wherein said toroidal duct and all direction-changing parts of said connections are substantially non-diffusing.

5. A diffusing and direction-changing duct unit for fluid, having a first duct portion which includes an annular diffuser with radially spaced inner and outer walls arranged circularly about an axis to define an axially extending diffuser annulus, said walls being straight in the axial direction, a toroidal duct portion connected to the said first duct portion and disposed around the diffuser axis, and an outlet pipe extending from the toroidal duct transversely to the diffuser axis, wherein the said first duct portion opens into the toroidal duct at the periphery of the latter and substantially along a radius of the toroid.

6. A duct unit according to claim 5 wherein the said first duct portion includes an annular connection from the diffuser to an annular inlet around the periphery of the toroidal duct portion, which connection has at least in part the section of a substantially 180° pipe bend, the toroidal duct portion being disposed around the outside of the diffuser.

7. A duct unit according to claim 6 wherein the said annular connection is of substantially non-diffusing form around the 180° bend.

8. A duct unit according to claim 7 including a straight duct portion of said annular connection which extends from the said 180° pipe bend along a radius of the toroid up to the peripheral inlet to the toroidal duct portion, which said straight portion is shaped to constitute a second annular diffuser.

9. A diffusing and direction-changing duct unit for fluid having a first duct portion which includes an annular diffuser with radially spaced inner and outer walls arranged circularly about an axis to define an axially extending diffuser annulus and a non-diffusing transfer section connected to said diffuser and curved radially outwards from said axis, a toroidal duct portion connected to said first duct portion and disposed around said axis, and an outlet pipe extending from the toroidal duct transversely to said axis, wherein the first duct portion opens into the toroidal duct portion at the periphery of the latter and substantially along a radius of the toroid.

10. A diffusing and direction changing duct unit for fluid having a first duct portion which includes an annular diffuser with radially spaced inner and outer walls arranged circularly about an axis to define an axially extending diffuser annulus and a non-diffusing transfer section connected to said diffuser and curved radially outwards from said axis, a toroidal duct portion connected to said first duct portion and disposed around said axis, and an outlet pipe extending from the toroidal duct transversely to said axis, wherein the first duct portion opens into the toroidal duct portion substantially along a radius of the toroid and the toroidal duct is of varying cross section around its circumference and substantially non-diffusing.

References Cited in the file of this patent

UNITED STATES PATENTS

| Number | Name | Date |
|---|---|---|
| 1,180,403 | Le Blanc | Apr. 25, 1916 |
| 2,247,817 | McMahan | July 1, 1941 |
| 2,577,134 | Land | Dec. 4, 1951 |
| 2,596,646 | Buchi | May 13, 1952 |
| 2,620,230 | Hait | Dec. 2, 1952 |
| 2,646,209 | Galliot | July 21, 1953 |
| 2,650,060 | Stalker | Aug. 25, 1953 |

FOREIGN PATENTS

| 336,840 | Great Britain | Oct. 23, 1930 |